United States Patent [19]
Oppermann et al.

[11] Patent Number: 5,533,484
[45] Date of Patent: Jul. 9, 1996

[54] SPEED CONTROL BY AN AUTOMATIC LOAD DISPLACEMENT DEVICE FOR AN INTERNAL COMBUSTION ENGINE OF A MOTOR VEHICLE

[75] Inventors: Rolf Oppermann, Schwalbach; Wolfgang Sauerschell, Oberursel; Jiri Martinovaski, Steinbach, all of Germany

[73] Assignee: VDO Adolf Schindling AG, Frankfurt, Germany

[21] Appl. No.: 383,760

[22] Filed: Feb. 2, 1995

[30] Foreign Application Priority Data

Feb. 3, 1994 [DE] Germany .......................... 44 03 197.1

[51] Int. Cl.$^6$ ................................................. F02D 31/00
[52] U.S. Cl. ............................................................ 123/358
[58] Field of Search .................................. 123/357, 358, 123/350–352

[56] References Cited

U.S. PATENT DOCUMENTS

| | | | |
|---|---|---|---|
| 4,343,274 | 8/1982 | Butscher | 123/358 |
| 4,887,684 | 12/1989 | King | 123/350 |
| 4,930,594 | 6/1990 | Koshizawa et al. | 123/350 |
| 5,036,815 | 8/1991 | Augustin et al. | 123/358 |
| 5,420,793 | 5/1995 | Oo et al. | 123/350 |

*Primary Examiner*—Thomas N. Moulis
*Attorney, Agent, or Firm*—Martin A. Farber

[57] ABSTRACT

A load displacement device for a motor vehicle has a servomotor drivable in two directions of rotation and driving a coupling gear wheel which is guided by a coupling lever. An electromagnet swings the coupling lever against the force of a spring in order to bring the coupling gear wheel into engagement with the teeth of a second gear wheel. The teeth of the coupling gear wheel and/or of the second gear wheel are asymmetrically developed in order to produce a flat engagement angle between teeth of the gear wheels. The flat engagement occurs in both directions of rotation of the second gear wheel and the coupling gear wheel. No tooth displacement forces which cause a swinging of the coupling lever into a disengaged position occur due to the engagement of the teeth.

2 Claims, 4 Drawing Sheets

SPEED CONTROL BY AN AUTOMATIC LOAD DISPLACEMENT DEVICE FOR AN INTERNAL COMBUSTION ENGINE OF A MOTOR VEHICLE

FIELD AND BACKGROUND OF THE INVENTION

The present invention relates to an automatic load displacement device for the internal combustion engine of an automotive vehicle, wherein the displacement device has a coupling gear driven by a servomotor and held against a coupling lever, the coupling lever being swingable by an electromagnet around an axis against the force of a spring, and wherein the coupling gear engages in coupled condition into a gear wheel which is part of an actuator mechanism which actuates a setting member for setting a level of fuel flow into the engine.

Load displacement devices of the above type are known and customary in commercial vehicles in order to limit the maximum possible speed of the vehicle. By way of example, since the beginning of 1994, a structurally limited maximum speed of 85 km/hr, which can be achieved with such automatic load displacement devices, has even been required by law in Germany for trucks.

The known load displacement devices which operate as a speed limiter are connected by a rod to the injection pump of the diesel engine of the commercial vehicle. When the maximum speed set has been reached, an electronic controller gives a speed reduction command to the servomotor. In this way, the amount of fuel injected is decreased to such an extent by displacement of the injection pump that the speed of the vehicle remains constant. The forces in the actuator mechanism are so selected that upon operation of the servomotor, the coupling lever always holds the coupling gear wheel in engagement with the gear wheel of the actuator mechanism provided that the electromagnet which effects the coupling is acted on by current.

In passenger cars, load displacement devices, are known which make it possible not only to prevent exceeding a desired adjustable limiting speed but, in addition, also prevent a dropping below the set speed. This is accomplished in the manner that a throttle valve is increasingly opened when there is an increased need for power, for instance upon traveling up an incline. The displacement of the actuator member—the throttle valve of an injection pump—therefore takes place in two directions, in contradistinction to the undirectional limiting of the speed in commercial vehicles.

Recently, there has been an increasing desire to provide commercial vehicles also with the possibility of maintaining a desired constant speed which has been found desirable in passenger cars. However, since larger actuating forces must be produced for control of fuel in commercial vehicles than in passenger cars, existing speed control devices cannot be used for this.

The converting of existing speed limiters has also not been possible up to now since the load displacement necessary for speed regulation must take place in two directions and, in the case of speed limiters which are developed only for reducing the speed, the coupling gear wheel is disengaged by tooth repelling forces upon a reversal of the direction of rotation for the increasing of the speed. The reason for this is that the forces on the coupling lever are dependent on the direction of the load, and speed limiters are so designed that with the direction of load which is alone present in them, the tooth-displacement forces do not lead to an uncoupling.

In order to avoid an uncoupling in the load displacement device, the electromagnet which effects the coupling when the ignition is turned on could be made sufficiently strong so that the force produced by the electromagnet sufficiently overcomes the tooth displacement forces of the coupling gear and the gear wheel even in the most unfavorable case. Such an embodiment, however, would have the disadvantage that the electromagnet would produce a relatively large amount of heat which would be injurious for the plastic teeth of the gears of the actuator mechanism. Aside from this, the cost of manufacture would be considerably increased by a strong electromagnet and the structural size of the load displacement device as well as its energy consumption would increase undesirably greatly.

SUMMARY OF THE INVENTION

The object of the present invention is to develop a load displacement device which permits displacement of the load in two directions and for the manufacture of which devices or parts required to the greatest possible extent can be used also for other purposes.

This problem is solved in accordance with the invention in the manner that the servomotor is designed for operation in two directions of rotation for control of vehicle speed wherein the teeth of the coupling gear wheel and/or the gear wheel are constructed for the production of a flat engagement angle by asymmetrical development, in such a manner, that in neither direction of rotation of the gear wheel and rotation of the coupling gear wheel are there tooth-repelling forces which lead to a swinging of the coupling lever into the uncoupled position due to the engagement of the teeth.

By this asymmetric development of the teeth in accordance with the invention, the result is obtained that the tooth displacement forces are so low in both possible directions of rotation that, without increasing the force of an electromagnet which is dimensioned for one direction of rotation, there is no uncoupling of the coupling gear wheel also in the opposite direction of rotation. In this way, it is possible to use a load displacement device which up to now has been used only for limiting speed, as a cruise control by replacing the two gear wheels. The development of the servomotor for operation in the two directions of rotation generally requires no additional expense because, as a general rule, the motor need merely be reversed in polarity for this purpose.

The replacement of two gear wheels is far less expensive than, for instance, the use of a stronger electromagnet or a change in the overall geometry of the coupling lever and its axis. In addition, the load displacement device of the invention with the asymmetric gear wheels can also be used as speed limiter so that only a single embodiment of the device is required for the two cases of use.

It would itself be advantageous if the tooth displacement forces were reduced by an asymmetry of the teeth. The required holding force of the electromagnet can, however, be particularly slight if, in accordance with a further advantageous development of the invention, as a result of the asymmetry of the teeth, the resultant force produced by the tooth engagement and acting on the coupling lever has a direction of force which passes through the axis of the coupling lever or extends at a slight distance from the axis on the side of the electromagnet.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
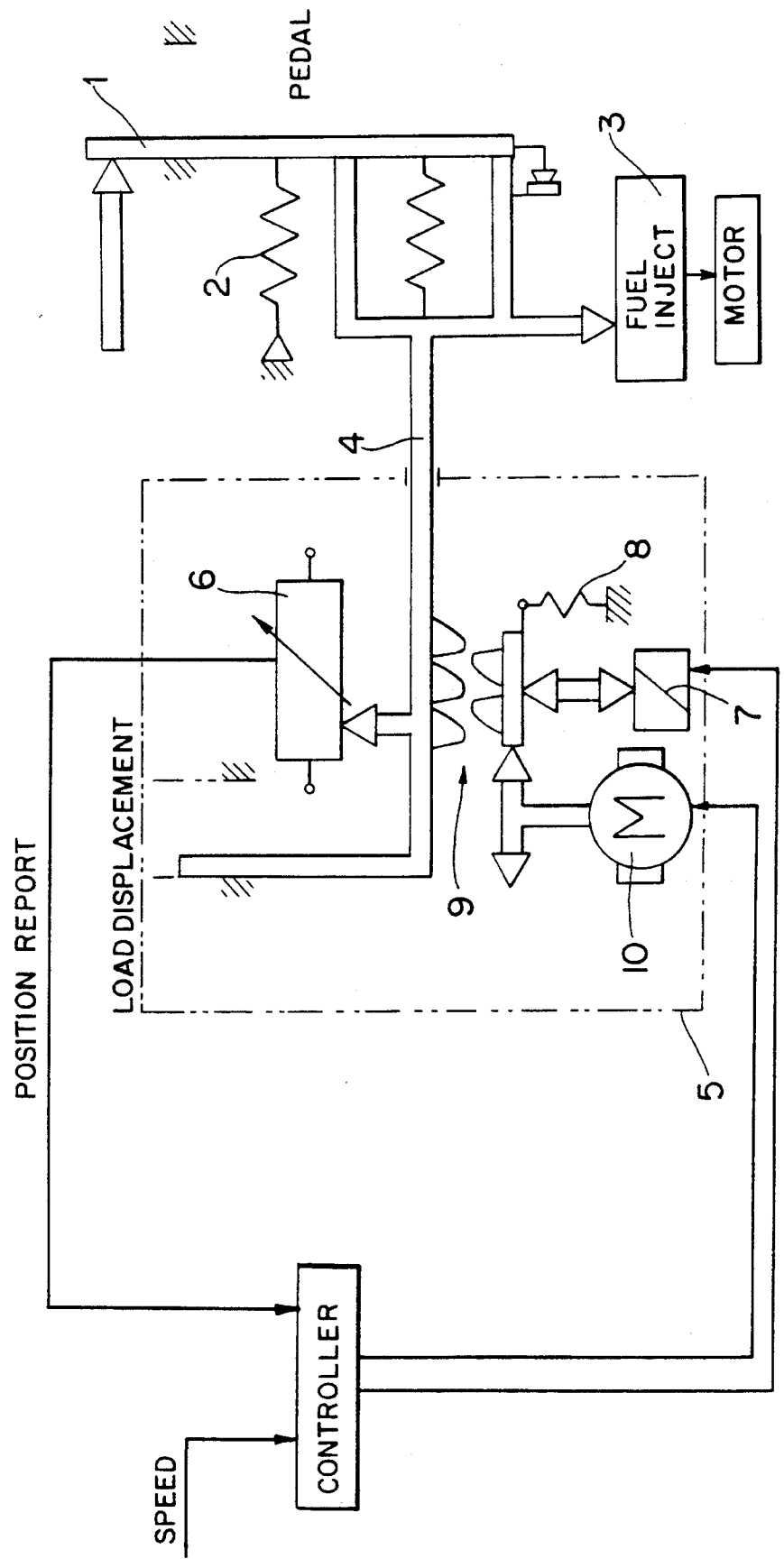
FIG. 1 is a basic diagram of a load-displacement device which can have the features in accordance with the invention.

FIG. 1 shows an accelerator pedal 1 for actuation by a driver which is adapted to be moved to the right in FIG. 1 against the force of a pedal spring 2 in order to increase the power of the motor of the vehicle. An injection pump 3 is displaced by this displacement of the accelerator pedal 1.

A rod 4 moves synchronously with the accelerator pedal 1, the rod 4 extending into a load displacement device 5 with its movements therein being monitored by a potentiometer 6. By the flow of current through an electromagnet 7, a coupling 9 can close against the force of a spring 8, the coupling 9 connecting the rod 4 with a servomotor 10. In this way, the servomotor 10 is able, depending on its direction of rotation, to push the rod 4 to the right or the left and in that way displace the injection pump 3 independently of the accelerator pedal 1, in the direction of larger or smaller injection. By way of example in the activation of the electromagnet 7 and the servomotor 10, it is noted that any one of various controllers, which do not form a part of the invention, may be employed for electrically activating the electromagnet 7 to operate the coupling 9 for connection of the rod 4 with the servomotor 10. Such controller may also command the servomotor 10 to position the rod 4 to accomplish a desired function. Accordingly, by way of example, FIG. 1 shows a controller outputting signals to the electromagnet 7 and the servomotor 10 in response to a feedback report of the position of the rod 4, via the potentiometer 6, and a speed signal such as the speed of the vehicle obtained from a well-known speed sensor.

Figure 2:
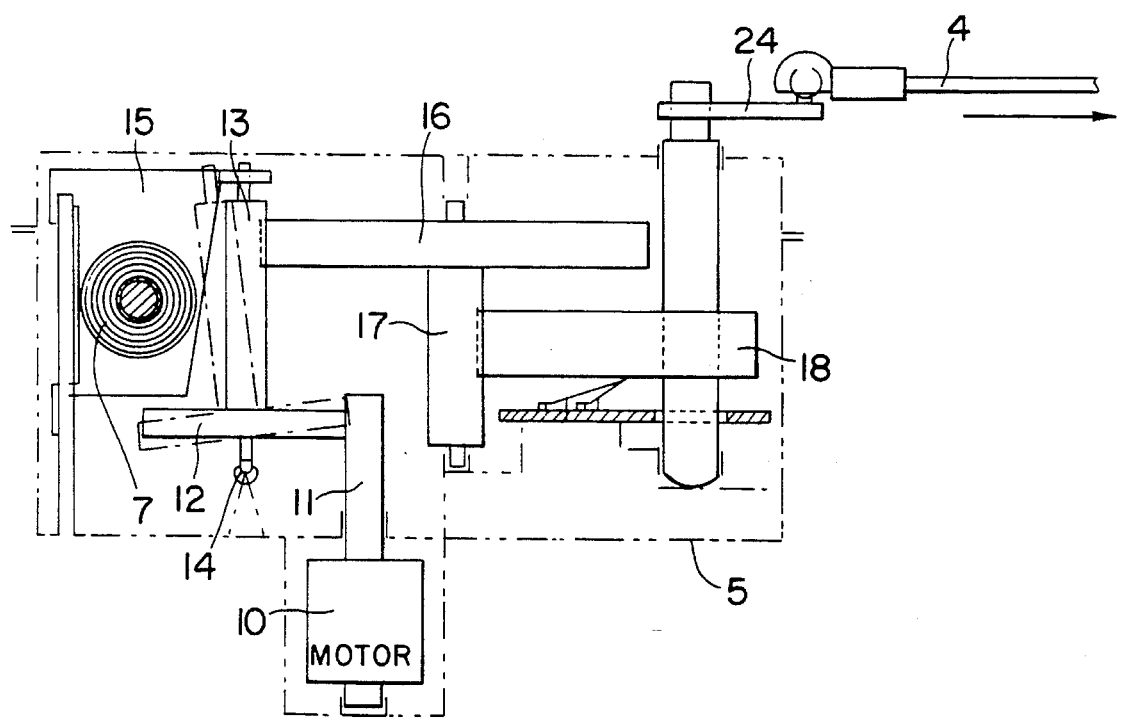
FIG. 2 is a diagrammatic side view of a concrete embodiment of the load displacement device.

FIG. 2 shows that the servomotor 10 engages, via a pinion 11, into a gear wheel 12 which is integral with a coupling gear wheel (pinion) 13 and is capable of swinging around a bearing 14 when a coupling lever 15 is swung. By this swinging movement, the coupling gear wheel 13 comes out of engagement with a gear wheel 16 which drives a toothed segment 18 by means of a gear wheel 17. The toothed segment can swing a lever 24 by which the rod 4 is swung in one or the other direction depending on the direction of rotation of the servomotor 10. FIG. 2 also shows the electromagnet 7 by which, under the action of current, the coupling lever 15 is swung, and the coupling gear wheel 13 thus moved into the position shown, in which it engages into the gear wheel 16.

Figure 3:
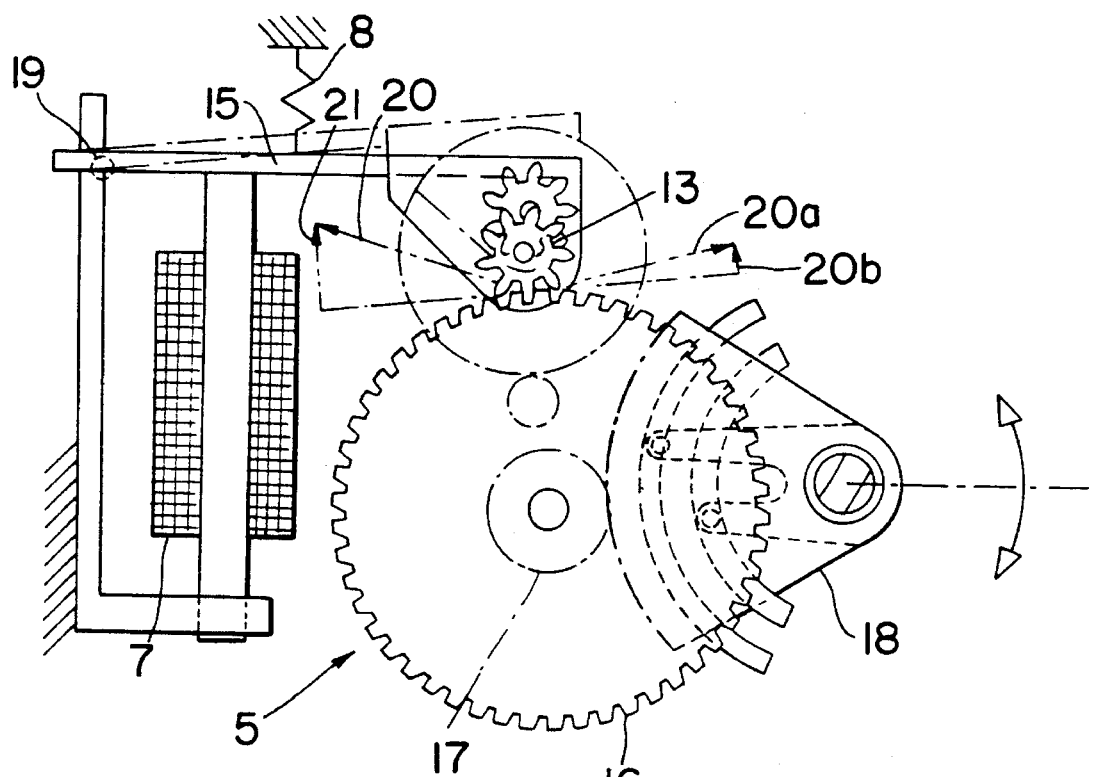
FIG. 3 is a top view of the load displacement device of FIG. 2.

FIG. 3 shows that the coupling lever 15 can be swung by the electromagnet 7 against the force of the spring 8 around an axis 19, as a result of which the coupling gear wheel 13 engages into the toothing of the gear wheel 16 or disengages from it. The segment disk 18 which effects the setting movement is furthermore shown in FIG. 3.

It is important for the invention that the coupling gear wheel 13, when in coupled condition, does not swing by itself against the force of the electromagnet 7 out of the toothing of the gear wheel 16. For this purpose, the forces occurring as a result of the tooth engagement must have the smallest possible components of force transverse to the plane of the main extent of the coupling lever 15. By a special tooth development the result is obtained that, upon rotation of the coupling gear wheel 13 in counterclockwise direction, the tooth engagement forces have the direction and intensity of force indicated by an arrow 20, as a result of which an ejection force 21 results for the coupling gear wheel 13. The corresponding forces upon the opposite direction of rotation—and therefore rotation of the coupling gear wheel 13 in clockwise direction—are also shown in FIG. 3 and their position indicated by force vectors 20a and 20b.

Figure 4:
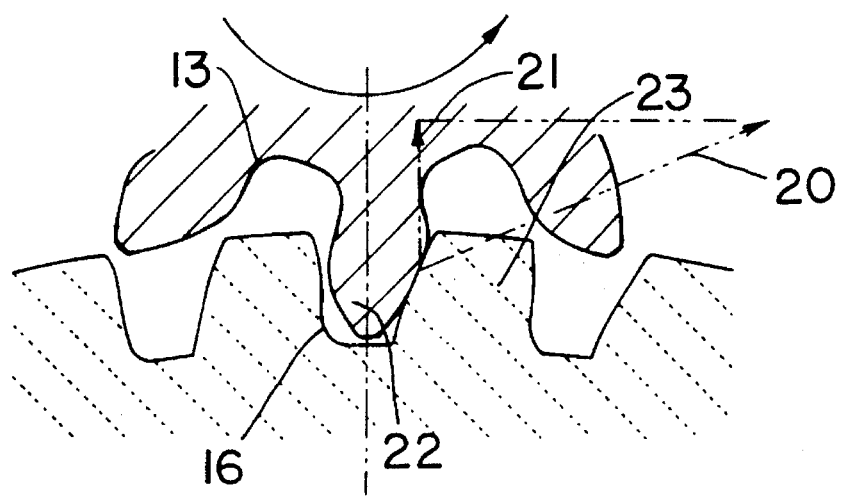
FIG. 4 is a diagrammatic view of tooth pairing, in accordance with the invention, of the load displacement device, with the forces resulting in one direction of rotation.
Figure 5:
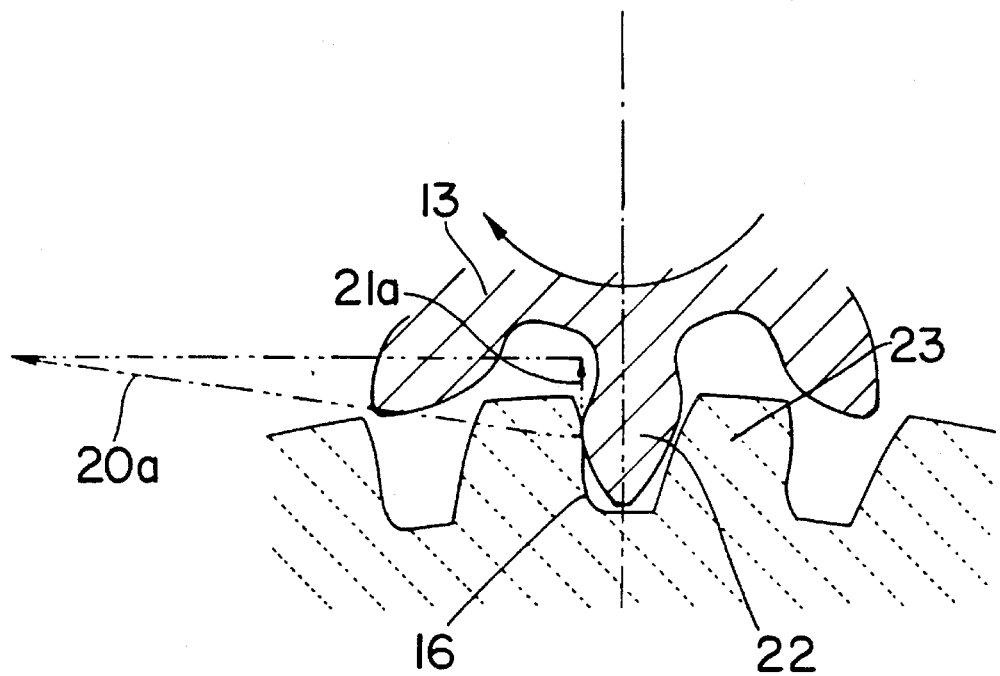
FIG. 5 shows the tooth pairing of FIG. 4 with the forces resulting in the direction of rotation opposite that of FIG. 4.

FIGS. 4 and 5 show that the coupling gear wheel 13 as well as the gear wheel 16 have asymmetric teeth 22, 23. They are so shaped that, in both directions of rotation, the resultant vectors 20 and 20a are sufficiently flat (tangential to the gear wheels) in order to avoid unintended disengagement.

We claim:

1. A load displacement device for a motor vehicle, the displacement device comprising a coupling gear wheel, a servomotor, a coupling lever, an electromagnet, a spring, and an actuator having a second gear wheel and a setting member for setting a flow of fuel;

wherein said coupling gear wheel is driven by said servomotor and is held against said coupling lever, said coupling lever is swingable around an axis by said electromagnet against a force of said spring;

in coupled condition of said gear wheel, said coupling gear wheel engages into said second gear wheel;

said servomotor is operative in two directions of rotation;

teeth of at least one of said gear wheels are developed asymmetrically in both directions of said at least one gear wheel in order to produce a flat engagement angle between teeth of said coupling gear wheel and said second gear wheel; and no tooth displacement forces which produce a swinging of said coupling lever into a disengaged position occur due to the engagement of the teeth of said gear wheels.

2. A cruise control device for a motor vehicle, the displacement device comprising a coupling gear wheel, a servomotor, a coupling lever, an electromagnet, a spring, and an actuator having a second gear wheel and a setting member for setting a flow of fuel;

wherein said coupling gear wheel is driven by said servomotor and is held against said coupling lever, said coupling lever is swingable around an axis by said electromagnet against a force of said spring;

in coupled condition of said gear wheel, said coupling gear wheel engages into said second gear wheel;

said servomotor is operative in two directions of rotation;

teeth of at least one of said gear wheels are developed asymmetrically in both directions of said at least one gear wheel in order to produce a flat engagement angle between teeth of said coupling gear wheel and said second gear wheel;

no tooth displacement forces which produce a swinging of said coupling lever into a disengaged position occur due to the engagement of the teeth of said gear wheels; and due to asymmetry of the teeth of said gear wheels, a resultant force produced by tooth engagement and acting on said coupling lever has a direction of force which passes through the axis of said coupling lever or extends on a side of the axis facing the electromagnet.

* * * * *